United States Patent [19]

Chelminski

[11] Patent Number: 4,779,245

[45] Date of Patent: Oct. 18, 1988

[54] LONG-LIFE, LOW-MAINTENANCE AIR GUN/HYDRO GUN

[75] Inventor: Stephen V. Chelminski, West Redding, Conn.

[73] Assignee: Bolt Technology Corporation, Norwalk, Conn.

[21] Appl. No.: 762,966

[22] Filed: Aug. 6, 1985

[51] Int. Cl.$^4$ .......................... G01V 1/04; H04R 1/02
[52] U.S. Cl. .................... 367/144; 367/146; 181/120
[58] Field of Search ............... 181/115, 116, 117, 118, 181/119, 120, 121; 367/143, 144, 145, 146; 61/63

[56] References Cited

U.S. PATENT DOCUMENTS

| | | | |
|---|---|---|---|
| 3,379,273 | 4/1968 | Chelminski | 181/5 |
| 3,808,822 | 5/1984 | Chelminski | 61/63 |
| 4,034,827 | 7/1977 | Leerskov, Jr. et al. | 181/111 X |
| 4,234,052 | 11/1980 | Chelminski | 181/120 |
| 4,271,924 | 6/1981 | Chelminski | 181/120 |
| 4,603,409 | 7/1986 | Jaworski | 367/146 |

FOREIGN PATENT DOCUMENTS 2023829 1/1980 United Kingdom ................. 181/120

OTHER PUBLICATIONS

Newman, Oil and Gas Journal, Aug. 7, 1978, pp. 138, 140, 143, 144, 146 and 150.
Seismic Systems Brochure, Hydropneumatic Waterguns, "Pneumatic or Hydraulic", Houston, Texas 1983.
Renard et al., Simplon Water Gun, A New Implosion Type Seismic Source, Offshore Tech. Conf., vol. 1, (1974) pp. 773-777.

Primary Examiner—Charles T. Jordan
Assistant Examiner—Brian Steinberger
Attorney, Agent, or Firm—Parmelee, Bollinger & Bramblett

[57] ABSTRACT

A long-life, low-maintenance air gun/hydro gun includes a one-piece, integral shuttle having an unusually long hollow shank with a firing piston whose configuration is the mirror image of the operating piston, except for the slightly smaller diameter "D" of the firing piston. The shank length L is at least 2.5 times D, and the whole shuttle is guided by this shank sliding within a shaft seal and bearing assembly. By virtue of this guidance, the perimeters of the operating and firing pistons are always kept slightly spaced from their respective associated cylinder walls for eliminating contact of these pistons with their cylinder walls for advantageously dramatically increasing the total number of operating firing cycles which can be accumulated in use before the need for replacing any worn parts, except for the operating and firing seals which are inexpensive. Thus, this air/hydro gun offers a low-maintenance feature. Further, it is only the shank-guiding bearing assembly which is replaced, instead of both of the cylinder walls; the perimeters of the two pistons do not become worn, and thus the operating characteristics (triggering/firing response) do not significantly change over long periods of repeated numerous cycles of operation, and triggering/firing "jitter" is avoided. In conjunction with the shank-guidance, a novel configured tapered wall surface of the operating chamber produces smoother acceleration and deceleration of the shuttle, so that operating stresses in the shuttle are reduced. This reduction in stresses plus the unitary one-piece construction of the shuttle provide a long operating lifetime for the shuttle. The housing of the air gun comprises two main components instead of the usual three. Therefore, only a single clamp ring holds the air gun together. Then, only one more clamp ring is employed to secure the outer housing of the hydro gun around the air gun. The change from air-to-hydro gun, and the change back to an air gun are both quickly and easily made on shipboard while at sea. The air gun and the hydro gun are less complex and lighter in weight than prior guns of comparable firing volumes, but they are powerful relative to their weight, thus being easier to handle at sea than earlier air guns or water guns. Advantageously, for controlling and modulating the acceleration and deceleration of fast-travelling shuttle the inner surface of the operating sleeve liner can be designed to have any desired configuration, because it is freed from the need to guide the rim of the operating piston by virtue of the fact that shuttle guidance is now (Abstract continued on next page.)

provided along the shank. The effective bearing length guiding the shuttle shank is more than three times the O.D. of the shuttle shank. The resilient O-ring firing seal is maintained under continuous spring-loading for enhancing its sealing ability and for automatically supporting this firing seal continuously biased toward its sealed position, thereby contributing to consistent, reliable, repeatable firing characteristics throughout a long operating life and providing a larger throat opening for the firing chamber.

15 Claims, 2 Drawing Sheets

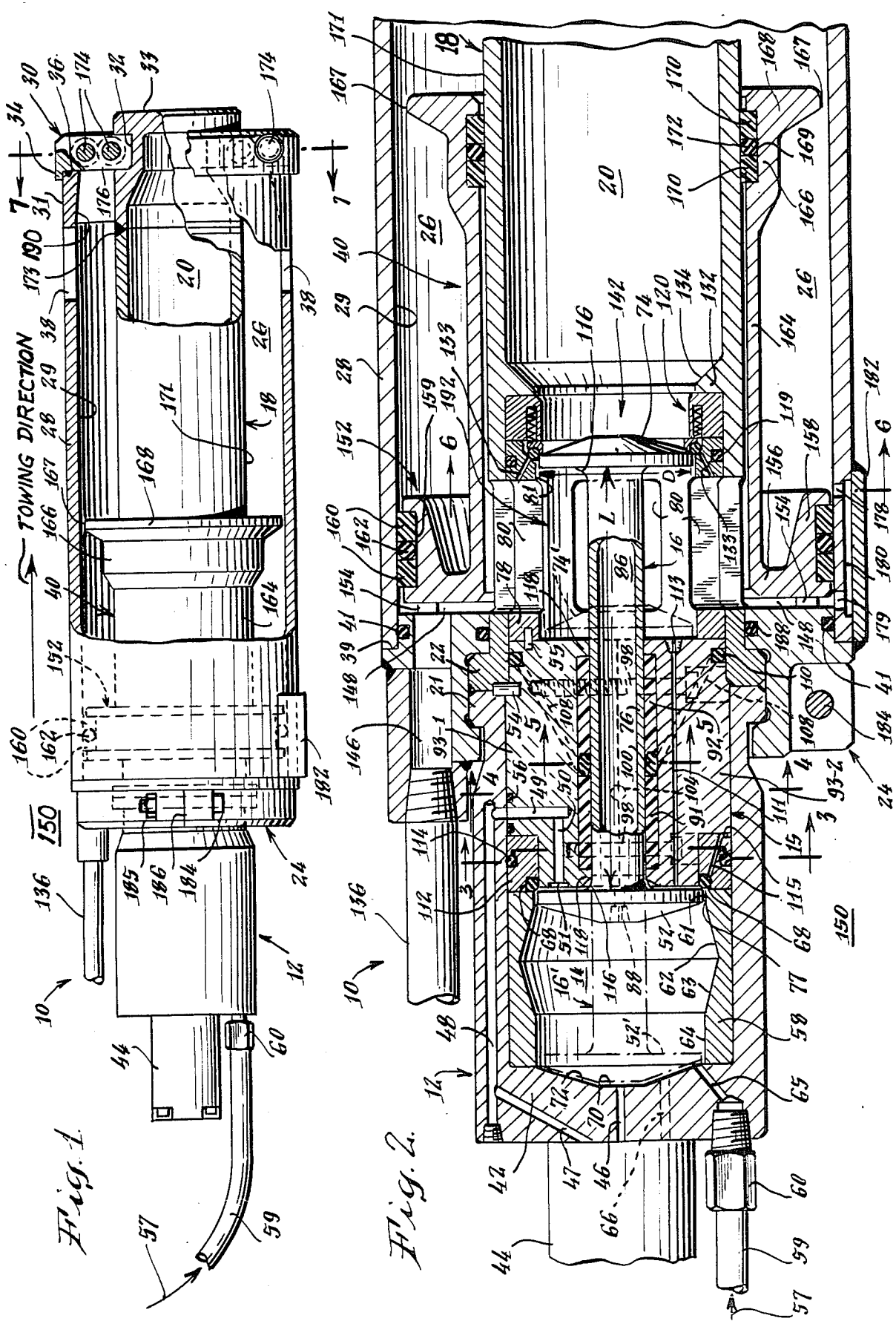

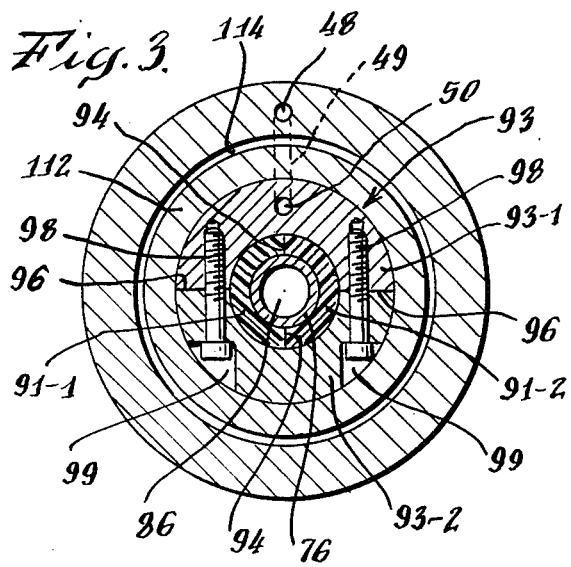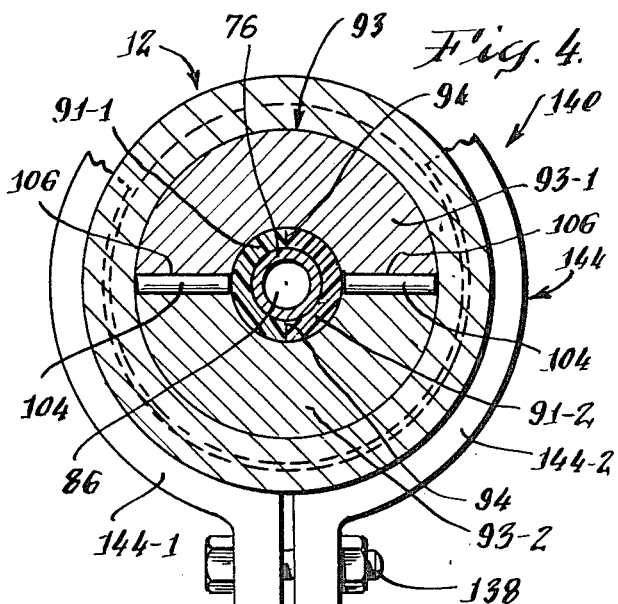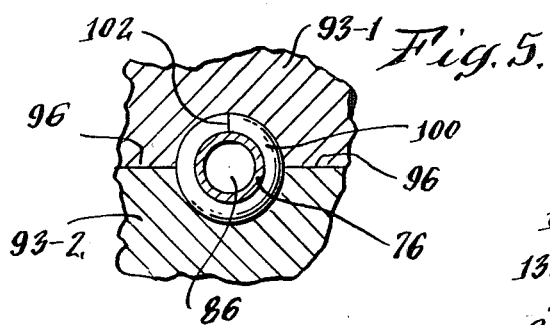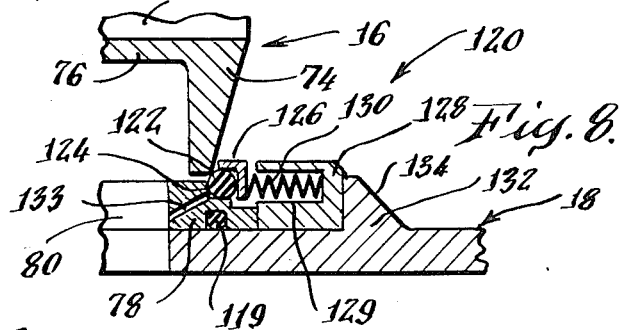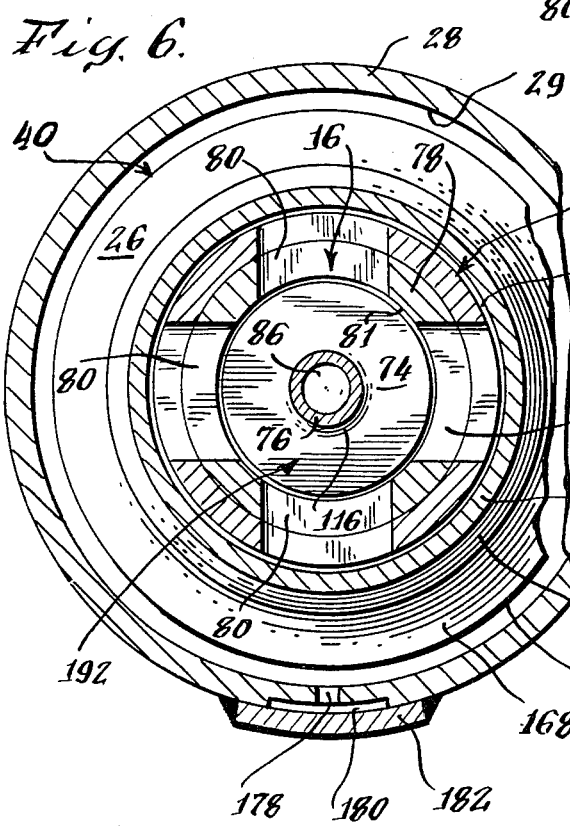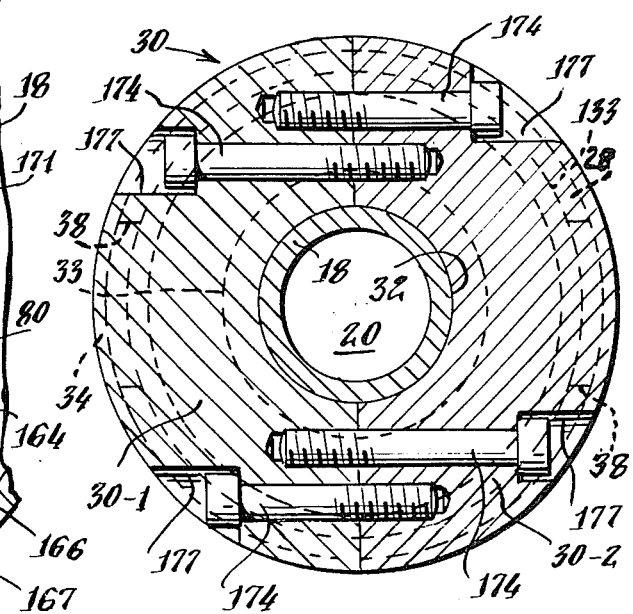

LONG-LIFE, LOW-MAINTENANCE AIR GUN/HYDRO GUN

FIELD OF THE INVENTION

The present invention relates to air guns and to hydro guns intended for use in generating seismic energy impulses, i.e. acoustical waves, in a body of water for use in marine seismic exploration. More particularly, this invention relates to a long-life and low-maintenance air gun/hydro gun which can easily and conveniently be changed from air-to-hydro gun operation and also easily and conveniently be changed back to air gun operation by a seismic survey crew on shipboard while at sea.

BACKGROUND OF THE INVENTION

Shuttle-type air guns known prior to the present invention generally include as their operating components a firing chamber for holding a charge of gas under high pressure, usually compressed air, a two-piston shuttle which can be triggered to abruptly release this charge of pressurized gas through discharge ports, means for supplying gas under high pressure to charge the firing chamber, and a solenoid-operated valve for causing the shuttle to be actuated for suddenly discharging the pressurized gas from the firing chamber. The two-piston shuttle has a firing piston positioned near the firing chamber for retaining the charge of pressurized gas therein and an operating piston positioned in an operating chamber wherein pressurized gas acts against this operating piston to maintain the shuttle in a closed position until it is released. The pistons of the shuttle are interconnected by a shaft or shank which is hollow for permitting a supply of pressurized gas to flow from the operating chamber through the hollow shank into the firing chamber for charging the latter chamber.

There is copending a patent application entitled: "METHOD AND APPARATUS FOR CONVERTING AN AIR GUN INTO A HYDRO GUN FOR MARINE SEISMIC IMPULSE GENERATION", U.S. Ser. No. 680,733, filed Dec. 12, 1984, in my name as sole inventor. The reader is referred to the specification, drawings and claims of that patent application as background information for better understanding the present invention. This present invention provides improvements and advantages over the air gun and hydro gun apparatus disclosed therein.

There is also a copending patent application entitled: "AIRGUN HAVING SHAFT-BEARING-GUIDED SHUTTLE AND CAPABLE OF FAST REPETITION SELF-FIRING", U.S. Ser. No. 672,107, filed Nov. 15, 1984, in my name as sole inventor. This latter patent application describes an air gun and does not describe a hydro gun.

The present invention, in certain of its aspects, provides improvements and advantages over the apparatus disclosed in the latter application.

SUMMARY

Among the improvements and advantages provided by air guns/hydro guns embodying the present invention are the following:

1. A long operating life is achieved. These present air guns/hydro guns, as shown and described, will operate for at least 1,000,000 firing cycles without significant wear; whereas, the air gun portions of the apparatus disclosed in Ser. No. 680,733, and also earlier commercial shuttle-type air guns, normally evidence significant wear of the rims of the operating and firing pistons and wear of the cylinder wall liners of the operating and firing cylinders after about 100,000 firing cycles, such wear usually necessitating replacement of these main components of the air gun at or soon after 100,000 firing cycles of operating life have been accumulated.

2. Low-maintenance costs are achieved because of the operating life of these three main components will likely be extended ten-fold and likely considerably more.

3. By virtue of the fact that the operating chamber sleeve liner and firing cylinder sleeve liner do not wear, they last indefinitely and the perimeters of the operating and firing pistons also do not wear and last indefinitely. Therefore, the inherent momentary time delay occurring between triggering and firing of the illustrative air guns advantageously remains essentially constant throughout their operating lives. In other words, consistent and reliable operating characteristics are achieved and thus there is no significant "jitter" in firing characteristics.

4. The simplicity of assembly and disassembly of the air gun portion of the air/hydro gun is striking. Only one clamping ring secures the two housing components of the air gun together.

5. The air/hydro gun is versatile. It is easily and conveniently changed from an air gun to a hydro gun and easily and conveniently changed back again on shipboard while at sea.

6. The air gun itself is lighter in weight as well as being simple in structure; so it is easy to handle, and yet relative to its weight it has a very powerful seismic energy output signal.

7. The hydro gun is lighter in weight as well as being simple in construction; so it is easy to handle. Relative to its weight, the hydro gun generates a very powerful seismic energy output signal.

8. The more recent techniques in using hydro guns call for relatively large numbers of hydro guns to be used in relatively long arrays towed behind the survey vessel in order to obtain a summation of their seismic energy signals generated by all of these numerous hydro guns in the large array. The lighter and less complex air/hydro guns provided by the present invention facilitate the employment and handling of these desired long arrays of large numbers of hydro guns.

9. The novel configuration of the surface of revolution inner wall surface of the operating chamber sleeve liner regulates the acceleration and deceleration of the fast-travelling shuttle during firing of the air gun better than the milled slots or cut-outs previously provided in the cylindrical inner surface of the operating sleeve liner. The inner surface of the operating chamber sleeve liner is not guiding the operating piston, and thus it is not in contact with the operating piston. Therefore, advantageously as a feature, the inner surface of this operating chamber sleeve liner can now be made in any desired configuration. Various angles of slopes can be used. The length of the various sloping regions can be long or short or inbetween, as may be desired. The sleeve can be readily removed and replaced with another sleeve having a different configuration when it is desired to change the acceleration or deceleration of the shuttle during its fast-travelling firing stroke.

10. The one-piece integral shuttle is very strong, but it is relatively light in weight compared with the size of the firing chamber being discharged. Moreover, this shuttle has a shank length "L" which is at least 2.50 times the diamter "D" of the firing piston. The light weight of the shuttle plus its unusually large shank-length-to-firing-piston-diameter ratio enables variations in the configuration of the inner surface of the operating chamber sleeve liner to control significantly the acceleration and deceleration of the fast-travelling shuttle during its firing stroke.

11. The effective bearing length guiding the shuttle shank is advantageously more than three times the outside diameter (O.D.) of the shuttle shank, thereby advantageously providing a very smooth positive and very accurate guidance for the fast-travelling shuttle; whereas, in application Ser. No. 672,107, the largest ratio disclosed for effective bearing length to O.D. of the shuttle shank is two (actually 1.97). That application discloses and teaches, in my view, an important improvement in air guns, and the present invention represents yet a further important improvement thereover.

12. The resilient O-ring firing seal is maintained under continuous spring pressure and is in contact with the perimeter and/or rounded edge of the perimeter of the firing piston, when the shuttle is in its initial position prior to firing. This continuous spring-loading enhances the sealing ability of the O-ring firing seal and also extends the operating life of this O-ring firing seal by providing additional resiliency continuously biasing this seal toward its sealing relationship. Therefore, this continuous spring-loading of the O-ring firing seal also contributes to the consistent, reliable, repeatable firing characteristics throughout a long operating life. Also, the throat opening of the firing chamber can be enlarged relative to the size of the air/hydro gun.

13. The illustrative example of the air/hydro gun as shown in the drawings is capable of consistent, reliable, repeatable firing as a hydro gun at intervals as often as once every six seconds by virtue of the fact that the head space in the water cylinder and the discharge chamber adjacent the exposed portion of the shuttle shank and the top surface of the firing piston re-fill with water so quickly after firing of the hydro gun. In other words, there is a minimum of water-refill-volume in proportion to the power of the hydro gun, thus giving a rapid re-fill with water, which contributes to the rapid repeat firing capability. I do not know of any other commercially available water gun which will fire as rapidly as once every six seconds.

14. The single clamp ring and two-component housing arrangement of the air gun enables quick, convenient conversion into a hydro gun and vice versa.

15. In one recent experiment involving 1,000,000 firing cycles of accumulated operation, a Delrin polymeric firing seal of a prior type lasted for over 500,000 firing cycles, and the O-ring operating seal lasted for more than 300,000 firing cycles of an air gun embodying the shuttle shank guidance feature with the feature of clearance between the rims of the operating piston and firing piston and the inner wall surface of the operating chamber and discharge chamber, respectively. Such a long operating life for an O-ring operating seal or a polymeric firing seal of the prior type has previously been unknown. Typically, their operating lives are measured in tens of thousands of firing cycles. It is my theory for explaining this dramatic increase in such operating lives that in prior air guns the scraping of the rims of the operating and firing pistons along the inner wall surfaces of the operating and discharge chambers, respectively, created microscopic flakes or scrapings or slivers of chips worn off from the chamber wall surfaces. Then, some of these microscopic particles were carried by the rims of the respective pistons and inflicted microscopic injuries, such as cuts or nicks, in the surfaces of the respective seals. These microscopic injuries became stress concentration points leading to rapid degradation and deterioration of the operating and firing seals. Regardless of whether this theory is correct, a dramatic increase in the operating lives of the operating and firing seals has been achieved. In an even more recent experiment involving an O-ring firing seal, as shown in FIGS. 2 and 8, the O-ring firing seal has already been operating for more than 100,000 firing cycles. It appears to me that this novel O-ring firing seal with the novel continuous spring-loading as shown in FIG. 8 will last for at least 300,000 cycles.

BRIEF DESCRIPTION OF THE DRAWINGS

The invention, together with further objects, features, aspects and advantages thereof will be more fully understood and appreciated by consideration of the following description in conjunction with the accompanying drawings in which the respective elements bear the same reference numerals throughout the various views.

FIG. 1 is an elevational axial sectional view of a long-life, low-maintenance air gun/hydro gun embodying the present invention, the outer housing and firing chamber being shown partially broken away to illustrate internal construction. In operation for marine seismic exploration, this air gun/hydro gun is usually towed through the water in a generally horizontal position in the direction of the arrow toward the right.

FIG. 2 is an enlarged elevational sectional view taken along the axis of the air gun/hydro gun as seen in FIG. 1 for showing the working parts, including the integral shuttle in its initial position and the shaft bearing and seal asembly surrounding the shank of the integral shuttle. In FIG. 2 the extreme right end (front end) of the air gun/hydro gun of FIG. 1 is omitted for convenience of illustration.

FIG. 3 is a cross-sectional view taken along the plane 3—3 in FIG. 2 for showing the structure of the shaft bearing assembly.

FIG. 4 is a cross-sectional view taken along the plane 4—4 in FIG. 2 for showing a pair of straight O-ring strips for sealing the joint between the two semi-circular halves of the shaft bearing assembly for supporting and guidinq the hollow shank of the integral shuttle and also showing a clamp ring, in place of the clamp ring and hydro gun annular cylinder head as shown in FIG. 2.

FIG. 5 is a fragmentary cross-sectional view taken along the plane 5—5 in FIG. 2 for showing the split O-ring surrounding the hollow shank of the integral shuttle.

FIG. 6 is a cross-sectional view taken on the plane 6—6 of FIG. 2, showing the four air gun discharge ports and the hollow shank and firing piston of the shuttle, with the cylindrical housing of the hydro gun encircling the air gun housing.

FIG. 7 is a cross-sectional view of the front end clamp ring of the air gun/hydro gun, being a section taken on the plane 7—7 of FIG. 1.

FIG. 8 is an enlarged fragmentary sectional view of the continuously spring-loaded firing seal and associated parts.

DESCRIPTION OF THE PREFERRED EMBODIMENTS

Although the term "air gun" is used in this specification, it is to be understood that this apparatus may operate with any compressed gas or mixture of gases including steam. Accordingly, the term "air" as employed herein is to be construed as including any such gases or mixture of gases.

With particular reference to FIGS. 1 and 2, there is illustrated an air gun/hydro gun 10 in accordance with the present invention. At its core is a novel air gun comprising a two-component housing: including as the first component an operating chamer and bearing housing 12 containing an advantageously configured operating chamber 14 and a novel shaft bearing and seal assembly 15 for guiding the shank of a one-piece integral shuttle 16 and including as the second component a discharge port and firing chamber housing 18, which defines a firing chamber 20.

In actual use when submerged for marine seismic exploration this air gun/hydro gun 10 may be operated in any desired position. In most cases, when being towed through a body of water, this gun 10 will be oriented in a generally horizontal position being towed toward the right as shown in FIG. 1.

The operating chamber and bearing assembly housing 12 and the discharge port and firing chamber housing 18 are provided with abutting flanges 21 and 22, respectively, which are held securely together by the clamp ring 24 which also serves as the annular cylinder head for the annular hydro gun cylinder space 26.

The hydro gun portion of this air gun/hydro gun 10 includes an outer cylindrical housing 28 whose inner wall surface 29 forms a concentric outer surface of the annular hydro gun cylinder space 26. The front end 31 of this outer cylindrical housing 28 is secured in place by a clamp ring 30 (FIG. 7) which engages in a groove 32 in the front end 33 of the housing 18. The clamp ring 32 has a lip 34 which forms a socket 36 embracing the end 29 of the outer housing 28. The outer cylindrical housing 28 includes a pair of diametrically opposed water discharge ports 38 through each of of which a slug of water is powerfully ejected during firing of the air gun/hydro gun 10.

The other end of the outer cylindrical housing 28 is seated against an annular shoulder 39 of the clamp ring and annular cylinder head 24 and is sealed thereto by an O-ring 41. An annular water piston 40 which is reciprocatable in an axial direction within the annular cylinder space 26 serves to eject the water slugs through the ports 38, as will be explained later.

The construction of the novel air gun portion of the air gun/hydro gun 10 will now be explained. The operating chamber and bearing assembly housing 12 has an end wall 42 on which a conventional solenoid-operated valve 44 is mounted for triggering the firing of the gun 10 in a manner well known to those skilled in the use of air guns in the field of marine seismic exploration. It is among the advantages of this air gun/hydro gun 10 that a conventional air gun solenoid valve 44 can be employed, and firing of the gun 10 is triggered by transmitting an electrical impulse to the solenoid valve 44 through an electrical cable (not shown) in a manner well known in this field. This solenoid valve 44 has an input port (not shown) communicating through an input passageway 46 with the operating chamber 14 of the air gun, and it has an output port (not shown) communicating through a sequence of serially connected trigger passageways 47, 48, 49, 50 with a shallow trigger chamber 51 located between the shaft bearing and seal assembly 15 and the underside of an operating piston 52 of the one-piece integral shuttle 16. The trigger chamber 51 extends over a portion of the underside of the operating piston 52.

Pressurized gas 57, for example compressed air under high pressure, i.e. in the pressure range from about 500 pounds per square inch (psi) up to about 3,000 psi (typically) or even higher, is supplied into the operating chamber 14 through a flexible high pressure hose line 59, and through a hose fitting 60 and a supply passage 65. The solenoid valve 44 may include a pressure sensor transducer as disclosed and claimed in U.S. Pat. No. 4,240,518 communicating through a passage, for example as shown dashed at 66, with the end of the operating chamber 14 for giving an electrical signal indicating the instant of actual firing of the air gun. During firing of the air gun, the operating piston 52 suddenly approaches the end wall 42 as shown in dashed outline at 52', thereby producing a sudden increase in pressure in passage 66.

It is to be understood that means are provided for assuring that the passageway 49 in the shaft bearing and seal assembly 15 is oriented into communication with the passageway 48 in the side wall of the housing 12 when the air gun components are assembled, for example such as a sequence of locating pins or dowel pins 54 and 55. An O-ring 56 seals passageway 48 to the passageway 49.

The air gun housing 12 includes an operating chamber sleeve liner 58. This sleeve liner 58 has an advantageously configured and tapered inner surface 61-62-63-64, being a surface of revolution. This inner surface of revolution 61-62-63-64 includes a first untapered cylindrical region 61 which extends in an axial direction parallel with the perimeter of the rim of the operating piston 52. Then there is a first tapered conical region 62 which flares outwardly upwardly (i.e. toward the end wall 42) at a relatively gradual small acute angle of taper for allowing the pressurized gas 57 in the operating chamber 14 to by-pass the perimeter of the operating piston 52 in progressively increasing amounts for allowing progressively increasng velocity of travel of the shuttle 16 after this operating piston has commenced moving upwardly away from an operating seal 68 during firing of the gun 10. This inner surface of revolution 61-62-63-64 includes a second tapered conical region 63 which converges inwardly upwardly at a relatively gradual small acute angle of taper, somewhat steeper than the taper of the surface 62 and in the opposite sense. This progressive decrease in diameter of the second conical region 63 progressively decreases the amount of pressurized gas by-passing the perimeter of the operating piston 52 as the shuttle continues its sudden upward motion. The purpose of this upward inward taper 63 is to damp and decelerate the upward travel of ths shuttle 16 as it nears the end of its upward firing stroke 16', 52' by progressively limiting the by-pass flow of pressurized gas past the perimeter of the operating piston, thereby acting as a dash pot damper and by progressively increasing the compression of pressurized gas trapped in front of (i.e. to the left of) the operating piston, as seen in FIG. 2. It is noted that this second (and steeper) conical tapered region 63 extends for a shorter length in the axial direction than the axial length of the first conical tapered region 62. Then, finally, there is a second untapered cylindrical region 64 which is several times longer in the axial direction than the first untapered region 61 for trapping and further compressing pressurized air located in front of the operating piston 52 for rapidly slowing the previously fast-travelling shuttle 16 as it approaches its full stroke position 16', 52' near the end wall 42. The advantages of this novel surface of revolution 61-62-63-64 defining the shape of the inner wall surface of the operating chamber 14 will be described further later in connection with a description of the operation of the air gun shuttle 16.

It is to be noted that the inner surface of the end wall 42 includes a flat circular central region 70 encircled by a truncated conical region 72, thereby defining a concave end surface for the operating chamber 14, and the top (left) convex surface of the operating piston 52 conforms closely thereto, being converse to this shape 70, 72. There is a firing piston 74 on the shuttle 16 integrally connected to the operating piston 52 by a long hollow shank 76. This firing piston 74 advantageously has the shape which is the mirror image of the operating piston 52, except that the diameter "D" of the firing piston is slightly smaller than that of the operating piston. In this presently preferred embodiment of the invention, the diameter D is 2-3/16ths inches (2.19").

The hollow shank 76 of the integral shuttle is unusually long as compared with the diameter of the firing piston, having a length "L" of 5-11/16ths inches (5.69"), thus having a length L which is preferably at least two and a half times the diameter D of the firing piston, because the whole shuttle 16 is advantageously guided solely by this shank 76 sliding within the shaft seal and bearing assembly 15. Consequently, the perimeter of the operating piston is not in sliding contact with the inner surface regions 61, 64 of the sleeve liner 58 in the operating chamber 14. The clearance between the perimeter of the operating piston and the liner 58 is seen at 77 (FIG. 2). Similarly, the perimeter of the firing piston 74 is not in sliding contact with another sleeve liner 78 (Please see also FIG. 6) located at the air gun discharge ports 80. The clearance between the perimeter of the firing piston 74 and the discharge port sleeve liner 78 is indicated at 81 in FIGS. 2 and 6. In this illustrative example, the actual ratio of L to D is 2.60. The volume of the charge of pressurized air in the firing chamber 20 prior to firing is about 100 cubic inches.

In another illustrative example of a presently preferred air gun/hydro gun embodying the present invention, the volume of the charge of pressurized air in the firing chamber prior to firing is about 350 cubic inches. In that example, the diameter D of the firing piston 74 is 2-31/32nds inches (2.97"), and the length L of the shuttle shank 76 is 8-5/16ths inches (8.31"). In that example the ratio of L to D is 2.80, which is a value well above the preferred lower limit of at least 2.50.

Among the advantages of constructing the shuttle 16 as an integral one-piece unit having pistons which are essentially mirror images of each other, i.e. the shuttle is essentially symmetrical: its weight (mass) can be reduced to the minimum possible amount consistent with the necessary extreme strength for resisting the great acceleration and deceleration inertial forces (tension, compression, shear, bending stresses) occurring during the fast-travel firing stroke and fast-travel return stroke of the shuttle. Moreover, this symmetry tends to equalize these inertial forces and stresses in the shuttle end-to-end and in each piston and to create symmetrical predictable stress patterns and similar stress distributions in each piston and in the adjacent portion of the integral shank.

In order to supply the high pressure air 57 from the operating chamber 14 into the firing chamber 20, the shuttle shank 76 has an axial passage 86 extending therethrough communicating with the operating chamber 14 through an orifice element 88 which screws into a threaded socket in the upper end of the passage 86. This orifice element 88 can be removed and replaced by another for changing the effeciive size of the orifice leading into the passage 86 for regulating the rate at which pressurized gas can flow through the axial passage 86 to recharge the firing chamber 20 after each firing of the air gun.

Inviting attention to the shaft bearing and seal assembly 15 (FIGS. 2, 3, 4 and 5), it is seen that this assembly includes first and second sleeve bearings 91 and 92 (FIGS. 2, 3 and 4) captured and held by a main bearing retainer 93. This main bearing retainer 93 is formed in two generally semi-cylindrical halves 93-1 and 93-2 (FIGS. 3 and 4). The two sleeve bearings 91 and 92 are identical in construction with each other, each being formed as a pair of semi-cylindrical halves. For example, in FIG. 4 can be seen the two semi-cylindrical halves 91-1 and 91-2 of the first sleeve bearing 91. It is to be noted, as shown in FIG. 3, that the splits 94 between the two halves 91-1 and 91-2 of the first sleeve bearing 91 are oriented generally at right angles to the splits 96 between the two halves 93-1 and 93-2 of the main bearing retainer 93. The splits (not shown) between the two halves of the second sleeve bearing 92 are oriented similarly to those of the first sleeve bearing.

The reason for constructing each of these sleeve bearings 91, 92 and their retainer 93 in semi-circular halves is to enable them to be assembled around the shank 76 of the one-piece integral shuttle 16. The two halves of the retainer 93 are suitably fastened together, for example by four machine screws 98 whose heads are recessed in counterbores 99 (FIG. 3).

An O-ring seal 100 (FIGS. 2 and 5) is captured between the axially spaced and aligned ends of the first and second sleeve bearings 91 and 92. In order to assemble this O-ring 100 onto the shank 76, this O-ring has a split 102.

In order to prevent air leakage in an axial direction along the split 96 in the main retainer 93, there are a plurality of straight seal strips 104 (FIG. 4) which are mounted in respective grooves 106. Only two straight seal strips are shown by the sectional view of FIG. 4. It is preferred to use another two straight seal strips 108 as shown in dashed outline in FIG. 2, because their actual location is in the plane of the split 96. It is to be noted that the inner end of each seal strip 108 abuts firmly against the O-ring 100 for minimizing air leakage past each inner end. For minimizing air leakage past their outer ends, the outer ends of the strips 108 abut against another O-ring 110 which encircles the retainer 93, being seated in a peripheral groove in the retainer 93 for sealing this retainer to the inner surface of the housing 18 near its flange 22. It is interesting to note that these straight seal strips 108 are oriented at an angle of less than 45° to the axis of the air/hydro gun 10.

In order to hold the O-ring operating seal 68 (FIG. 2), there is a second retainer 112 in the form of an annulus. This annular retainer 112 need not be split, because its internal diameter (I.D.) is just slightly larger than the outside diameter D of the firing piston 74. Thus, the annular retainer 112 can be passed axially over the firing piston 74 during assembly. The operating seal 68 is received in an annular rabbet in the inner edge of the retainer 112. This retainer is sealed to the inner surface of the housing 12 by an encircling O-ring 114 (See also FIG. 3) in a peripheral groove in the retainer 112. A small bleed vent 111 for preventing inadvertent firing and for aiding reseating of the operating piston 52 extends in an axial direction through the main bearing retainer 93 into a discharge chamber 192 (to be described later) for venting to atmosphere through a vent line 136 (to be described later). This bleed vent 111 includes an orifice element 113 at its outlet end screwed into a socket in the retainer 93. There are bleed vents 115 (only one is seen) drilled in the annular retainer 112 for preventing compressed air from accumulating in the rabbet wherein the operating seal 68 is received. The bleed vents lead to an unsealed joint between the retainer 93 and the housing 12, and hence air can escape from this unsealed joint out between the flanges 21, 22 to the exterior.

It is noted that the bore of the main bearing retainer 93 is chamfered (bell mouthed) at each end for providing clearance for the radius 116 where the shank 76 joins the respective pistons 52 and 74. The retainer 93 has an inner lip 118 at each end for capturing the sleeve bearings 91 and 92, plus the O-ring 100, between these lips 118.

Directing attention to FIG. 6, it is seen that the four air gun discharge ports in the liner 78 are each aligned with four corresponding ports in the housing 18. The locating pin 55 in conjunction with the main retainer half 93-1 plus the other locating pin 54 engaging the inside of the housing flange 22 maintains this alignment of the ports 80. This sleeve liner 78 is sealed to the inner surface of the housing 18 by an encircling O-ring 119 (Please see also FIG. 8) located in a circumferential groove. This O-ring 119 is intentionally positioned intermediate the firing chamber 20 and the discharge ports 80 for preventing leakage of high pressure air from the firing chamber 20 out through these ports.

Inviting attention to FIG. 8, the advantageous construction of the continuously spring-loaded O-ring firing seal assembly 120 is seen. The O-ring firing seal 122 of resilient polymeric or rubber-like material, for example polyurethane, is received in a rabbet 124 in the inner edge of the discharge port sleeve liner 78. A seal support ring 126 of strong, rigid, durable, corrosion-resisting material, for example, stainless steel, has an L-shaped cross section and is positioned in opposition to the rabbet 124 for capturing the resilient seal 122 therebetween. A spring holder 128 has numerous spring sockets 129, for example a dozen, extending parallel to the gun axis, with a compression spring 130 located in each socket. This spring holder 128 is of strong, rigid, durable, corrosion-resisting material, for example, stainless steel or aluminum bronze. The spring holder 128 seats against an internal annular shoulder 132 within the housing, and the exposed surface 134 of this shoulder 132 is sloped for minimizing impedance to the sudden discharge of compressed air from the firing chamber 20. Vents 133 prevent compressed air from accumulating in the rabbet 124, because such accumulation would tend to dislodge the firing seal 122 during firing.

When being used solely as an air gun 140, then the outer shroud housing 28, the clamp ring 30, the annular piston 40, and the annular cylinder head clamp ring 24 and a vent line 136 (to be described later) are omitted. A conventional clamp ring 144 (FIG. 4) comprising two semi-circular halves 144-1, 144-2 fastened by suitable fastening means such as bolts 138 (FIG. 4; only one is seen) fits over the two abutting flanges 21, 22 for securing the air gun housings 12 and 18 together. In proportions as shown, the I.D. of the firing chamber 20 is about 3.0 inches, and it has an internal length of about 14.5 inches, thus providing a firing charge volume of 100 cubic inches.

When being used solely as an air gun, the survey team can readily change the firing volume over a range from 5 cubic inches up to 100 cubic inches (or slightly more, if desired) by removing the existing housing 18 and replacing it with another housing of similar diameter but of shorter length (or greater length, if desired to obtain more than 100 cubic inches). There is a practical upper limit to the maximum volume of the firing chamber 20, because of inherent flow limitations through the firing chamber throat 142 (FIG. 2) defined by the spring holder 128.

Advantageously, the cross-sectional area (flow area) of this throat 142 is about 40% larger than that of prior air guns of comparable size, because this spring-loaded O-ring firing seal 122 and its associated assembly 120 is much more compact than prior spring-loaded firing seal arrangements, thus enabling a more powerful discharge to occur due to less flow restriction. An example of the throat-restriction effect of prior spring-loaded firing seal arrangements is seen, for example, in U.S. Pat. No. 3,379,273 in FIG. 15, and U.S. Pat. No. 3,808,822 in FIG. 8, and thus the throat area of the firing chamber is restricted. The reason for the throat-restricting effect of such prior spring-loaded firing seal arrangements is that they considerably overlappingly contact the flat face or end surface of the firing piston as distinguished from the perimeter of the rim of the firing piston or the corner of the rim of the firing piston. The present spring-loaded firing seal advantageously engages the corner of the rim of the firing piston. It is true that in U.S. Pat. No. 4,271,924 a large throat area is achieved by means of a novel peripheral seal. However, that peripheral seal, which engages the perimeter of the rim of the firing piston is fixed in position in the wall region which encircles the firing piston when the shuttle is in its initial position. Although such a novel peripheral seal does provide the advantages described in that patent, the present spring-loaded O-ring seal 122, which can "float" in position somewhat as supported by the spring-biased seal support ring 126, has been found by recent experiments to yield a surprisingly long life and to give surprisingly repeatable, consistent, reliable accurate firing characteristics with insignificant jitter over an unusually long operating life.

During operation, the continuous spring-loading exerted by the springs 130 on the seal support ring 126 provides the advantages as described in the introduction.

FIGS. 1 and 2 show the air/hydro gun 10 rigged for use as a hydro gun. The vent line 136 includes a short pipe section as shown leading into a flexible hose section (not shown) which extends up to the surface for communicating with the atmosphere above the surface of the body of water 150 in which the gun 10 is being used. This vent line 136 communicates with a vent port 146 in the annular cylinder head 24 which, in turn, directly communicates with the head space 148 in the cylinder space 26. The head space 148 is located between the annular cylinder head 24 and the annular piston head 152 of the annular water piston 40. There are stops 154 which prevent the water piston head 152 from coming closer to the annular cylinder head 24 than the desired size of the head space 148.

The water piston head 154 is light in weight but strong in construction, having a thin top wall 156 with a peripheral skirt 158 having an encircling shallow groove 159. A pair of outer bearing rings 160 are carried in this groove 159 with a seal 162 located between these two bearing rings. At present, it is my preference to use an O-ring as the sliding seal 162 sandwiched between the two bearing rings 160. The inner cylindrical surface 29 of the outer shroud housing 28 is machined and finished as smoothly as reasonably possible to facilitate the sliding contact of the bearing rings 160 and the seal 162.

The body 164 of the water piston 40 comprises a relatively thin strong cylindrical wall 164 terminating at its lower (right) end in a thickened wall section 166 having a flared skirt thickened flange 168 whose outer rim 167 is spaced a small distance from the inner surface 29 of the outer shroud housing 28, as seen in FIGS. 1, 2 and 6. A shallow groove 169 extends around the interior of the thickened wall section 166 for carrying a pair of inner bearing rings 170 with a sliding seal 172 sandwiched between them; for example, this seal 172 preferably is an O-ring. The outer cylindrical surface 171 of the housing 18 is machined and finished as smoothly as reasonably possible for facilitating sliding contact of the bearing rings 170 and the seal 172. This housing 18 is made in two parts strongly welded together at 173 (FIG. 1).

The water piston 40 is constructed as light in weight as possible and is shaped and designed for having great strength for suddenly and powerfully ejecting a slug of water out through each of the two water ports 38 (FIGS. 1 and 7). These two water ports 38 are intentionally oriented during use aimed horizontally outwardly diametrically opposed on opposite sides of the air/hydro gun 10 for optimum hydro gun performance for reasons as explained and claimed in copending application Ser. No. 680,733 to which reference has previously been made.

The clamp ring 30 (FIGS. 1 and 7) is constructed as two semi-circular halves 30-1 and 32-2 securely fastened together by four socket head cap machine screws 174 arranged in pairs from opposite sides for providing considerable fastening strength, because this clamp ring 30 also serves to form an annular end wall surface 176 (FIG. 1) of the water cylinder space 26. Thus, this clamp ring 30 is subjected to a powerful thrust during each brief moment while the fast-moving water piston 40 is ejecting water through the ports 38. The heads of the screws 174 are recessed in counter bores 177.

The ambient water 150 enters into and fills the head space 148 after the hydrostatic pressure of this ambient water has advantageously automatically returned the water piston 40 to its initial position as claimed in application Ser. No. 680,733. This initial water piston position is shown in FIGS. 1 and 2. To enable re-entry of water, there are water re-entry ports 178 and 179 (FIG. 2) in the wall of the outer cylinder 28 which communicate with a passage 180 extending in an axial direction formed by a band 182 welded to the exterior of the outer cylinder wall 28. Consequently, after the water piston 40 has returned to its initial position, ambient water 150 reentering through the water ports 38 and through the cylinder space 26 flows past the piston rim 167 and through re-entry port 178, through passage 180 and through re-entry port 179 into the head space 148 for filling the head space and flows through the vent port 146 (FIG. 2) and through the vent line 136 for filling this vent line 136 all of the way up to sea level, and water also fills the discharge chamber 192 located within the sleeve liner 78. This discharge chamber 192 has also been called the "firing cylinder".

It is to be noted by comparing FIGS. 1 and 2 that for convenience of illustration a socket head cap screw 184 is shown at the bottom of FIG. 2 opposite to the location of the vent port 146. Actually, the true location of such a screw 184 plus a self locking nut 185 (FIG. 1) is one on each side of the annular cylinder head and clamp 24, with the vent port 146 truly located as shown at the top of the gun 10 during operation. Thus, the annular cylinder head clamp ring 24 is constructed in two generally semi-circular halves with a split 186 (FIG.1) located at each side of the gun 10, and the screws 184 and nuts 185 serve to secure together the two halves of the annular cylinder head and clamp 24. The two splits 186 in this annular cylinder head and clamp 24 are sealed, for example as explained in application Ser. No. 680,733, and this annular head member 24 is sealed to the outer surface of the housing 18 by an O-ring 188.

Also, for convenience of illustration in FIG. 1, the water ports 38 are shown at the top and bottom, but their optimum location during operation is on each side of the gun 10, as shown in FIG. 7.

When operating as a hydro gun, there are certain desirable interrelationships to be provided in correlating the volume of the firing chamber 20 and the initial pressure of the compressed air therein to the volume of water to be ejected from the annular cylinder space 26 and the stroke length of the water piston 40, for achieving a predetermined optimum expansion of the compressed air as is explained in application Ser. No. 680,733. In this example of FIG. 1, with a firing chamber 20 having a volume of about 100 cubic inches and being charged with compressed air at an initial pressure in the range from about 2,000 to about 3,000 p.s.i., then the volume of water to be ejected from the cylinder space 26 is optimally in the range from about 80 to about 150 cubic inches, and the water piston stroke length is about 7.5 inches from the initial position of the piston flange 168 to the center of each water port 38. In this example as shown in FIG. 1, the radius of surface 29 is 3.0 inches and the radius of surface 171 is 1.75 inches with a stroke length as defined above of 7.5 inches, thus giving a water volume displacement of about 140 cubic inches. The ratio of water displacement volume to firing chamber volume is thus about 1.4 to 1.

In another example discussed above wherein the firing chamber volume is about 350 cubic inches, and wherein the firing chamber is charged with compressed air at a pressure in the range of about 2,000 to about 3,000 p.s.i., the water displacement volume is about 510 cubic inches. The ratio of water displacement to firing chamber volume is thus about 1.46.

In summary, when operating at about 2,000 to about 3,000 p.s.i., the preferred ratio of water displacement to firing chamber volume is in the range from 0.8 to 1 to 1.5 to 1.

In the example illustrated in FIGS. 1 and 2, the effective overall length from the far end of the first sleeve bearing 91 to the far end of the second sleeve bearing 92 is 3.0 inches, and the O.D. of the shuttle shank is 0.75 of an inch. Thus, the ratio of effective bearing length to shank O.D. in this example is 4. It is my present preference that such ratio be more than 3 in order to provide smooth and accurate guidance for the unusually long shuttle shank.

There is an interior space 192 (FIGS. 2 and 6) within the discharge port liner 78 which is called the discharge chamber for the firing cylinder, and the firing piston travels back-and-forth in this discharge chamber 192 during firing of the air gun.

All parts of the air/hydro gun 10 are made of strong, tough, durable and corrosion-resistant materials, because the environmental operating conditions encountered at sea are extremely harsh, and the stresses occurring during firing are very great, due to the repeated, explosive-like sudden discharges involved, plus the stresses of being forcefully towed through the water submerged behind a survey vessel. The housings 12, 18 and 28, the shuttle 16, and the annular cylinder head clamp member 24, clamp ring 30 and the clamp ring 144 (of the air gun), annular operating seal retainer 112, firing seal support ring 126, spring holder 128, springs 130, and the pipe of the vent line 136, plus fastenings, such as machine screws, bolts and nuts are made of very strong, tough, durable, corrosion-resistant material, for example, high strength stainless steel. The water piston 40 may be made of stainless steel, but the presently preferred optimum material is titanium for light weight. The sleeve liners 58, 78 and the main bearing retainer 93 are also made of very strong, tough, durable, corrosion-resistant material, for example, aluminum bronze. The air gun housing 12 may be made of aluminum bronze, if desired, but the other housing 18 containing the firing chamber 20 and the discharge ports 80 is presently preferred to be made of high strength stainless steel. The sleeve bearings 91 and 92 are made of tough, durable, strong, slippery bearing material, for example, of high performance poly (amide-imide). The water piston bearing rings 160 and 170 are made of acetal resin. The seal strips 104 and 108 and the various O-rings, plus the operating seal 68, the firing seal 122, and the sliding seals 100, 162 and 172 are made of tough resilient polymeric rubber-like material, for example, polyurethane.

OPERATION

When operating the air/hydro gun 10 solely as an air gun 140, then the survey crew easily and conveniently removes the hydro gun components; namely, the annular cylinder head clamp member 24, the clamp ring 30, the outer cylinder shroud 28, the water piston 40, and the vent line 136. An air gun clamp ring 144 (FIG. 4) then replaces the annular cylinder head clamp member 24. During operation as an air gun 14, the solenoid valve 44 is periodincally actuated by electrical pulses, as explained above, for suddenly communicating the input passageway 46 with the trigger passageways 47, 48, 49 and 50 for triggering the release of the operating piston 52 from its operating seal 68. The high pressure compressed air in the firing chamber 20 suddenly drives the fast-travelling shuttle 16 toward its fully open position 52', 16', 74', for blasting compressed air out through the discharge ports 84 into the ambient water 150 for generating a powerful seismic energy impuse comprising powerful acoustical waves in the water.

The novel configuration of the inner surface of revolution 61-62-63-64 of the operating chamber liner 58 advantageously controls the acceleration and deceleration of the fast-travelling shuttle by controlling and modulating the flow of compressed air by-passing the rim of the operating piston 52 as it travels through its operating chamber 14. This control of the by-pass flow of compressed air is continuously modulated at each stage in the fast-travel of the operating piston 52 by virtue of the ability to use any desired pitch or pitches in the slopes 62 and 63 for obtaining the optimum rates of acceleration and deceleration of the shuttle 16 at each stage of its travel. More than two sloping regions 62, 63 may be used, and their slopes may change or be inflected or be curved or discontinuous as may be desired. Conic surfaces 62, 63 are shown as currently known examples, but future experimentation together with computer-aided analyses may show that hyperbolic or parabolic or elliptical surfaces of revolution are optimum for certain regions of this inner surface of the operating chamber wall. It is noted that hyperbolas, parabolas and elipses are all generically generated by taking sections through cones, and thus their surfaces of revolution are herein considered to be "conic" surfaces of revolution.

The important point to recognize is that the present invention as now conceived in its entirety is seen to free the inner surface of the operating chamber to be designed into any desired configuration whatsoever, because the rim of the operating piston 52 always has clearance 77 from this surface, because shuttle guidance is provided elsewhere as fully explained above.

Looking back in time with the advantage of hindsight, the reader will now see from my U.S. Pat. No. 4,271,924, which is incorporated herein by reference, that I was seeking ways then to control the flow of compressed air for controlling damping action near the end of the firing stroke of the shuttle. That patent describes and claims advantageous and novel ways to control such damping, but the present invention opens up possibilities for controlling and modulating shuttle acceleration and deceleration at each stage of the entire length of the shuttle stroke.

After the shuttle has reached its fully open position 52', 16', and 74', then the force of the compressed air in the operating chamber 14 acting against the projected area of the shank 16 (namely against the projected area defined within the bore of sliding seal 100) drives the shuttle back to its initial position. The configuration of the inner surface 61-62-63-64 also controls and modulates the acceleration and deceleration of the shuttle during its return stroke. During the return stroke, the short cylindrical surface 61 located near the operating seal 68 enables compressed air to be trapped briefly between the operating piston 52 and the main bearing retainer 93 for damping the termination of the return stroke. Such trapped air can thereafter bleed out through the bleed passage 111 and its orifice element 113 for enabling the operating piston fully to seat against its seal 68 while the firing piston 74 seats against its seal 122. Thereafter, the firing chamber 20 becomes recharged ready for the next firing by flow occurring through the axial shuttle passage 86.

When operating the air/hydro gun 10 as a hydro gun, then this gun 10 is arranged as shown with the water ports 38 oriented for being aimed out horizontally on each side. The vent 146 is oriented at the top and the re-fill passages 178, 180, 179 are oriented at the bottom for enabling re-entering water entirely to fill the head space 148 and fill the vent line 136 up to sea level and to fill the discharge chamber 193. The re-fill passage 178 is blocked by the water piston head 152 until the water piston has been returned to its initial position, as will be understood from FIG. 2.

The sudden blast of compressed air through the discharge ports 80 into the head space 148 forcefully drives the annular water piston 40 in its firing stroke toward the far end surface 176 (FIG. 1) of the annular cylinder space 26 for powerfully ejecting a slug of water out through each water port 38. Cavitation is produced in the ambient water by each slug, followed by sudden, simultaneous collapse of each cavity, thereby producing a sharp, powerful seismic energy impulse in the water.

The rim 167 of the water piston 40 coacts with the converging taper 190 located beyond the water ports 38 near the end wall 176 for employing progressively increasing restriction of water flow from between the end wall 176 and the water piston flange 168 to damp and arrest the firing stroke of the water piston after the rim 167 has passed the ports 38. Then, the discharged air, which has expanded in the cylinder space between the piston head 152 and the cylinder head member 24, escapes through the vent line 136 into the atmosphere. This escaping air must push water up through the vent line 136. Therefore, advantageously, the impedance of this mass of water in the vent line 136 prevents any significant escape of compressed air out through the vent port 146 during firing and allows the shuttle 16 to return to its initial seated fully closed position, before any significant venting of compressed air occurs through the vent line 136.

After such venting to atmosphere, the pressure of ambient water pushes the water piston 40 back to its initial position, as previously explained, and the ambient water refills the head space 148, the discharge chamber 192, the vent port 146, and the vent line 136 up to sea level, as explained previously.

Although it is my preference to construct the shuttle 16 as an integral one-piece member for the reasons as explained, it is quite possible and acceptable to use a two-piece shuttle in the air/hydro gun 10 by shaping the inner surface 70, 72 of the end wall 42 of the operating chamber 14 to provide clearance for the extending threaded end of the shank plus a fastening nut thereon, as will be understood from reviewing the two applications Ser. Nos. 680,733 and 672,107 to which reference has already been made and whose disclosures are incorporated herein by reference. Alternatively, the shuttle shank can be arranged to have the fastening nut located on the firing chamber end of the shuttle. The two-piece shuttle is slightly heavier, and the modified gun 10 containing such a shuttle is slightly heavier, but otherwise all of the many advantages and operating benefits of the present invention are provided regardless of whether a one-piece piece or a two-piece shuttle is used. When using a two-piece shuttle, the bearings 91, 92, the sliding seal O-ring 100 and the main bearing retainer 93 do not need to be split longitudinally for assembling the bearing assembly 15, because they can be slid onto the shank 76 before the operating piston 52 is fastened onto the shank by the fastening nut as shown in those two disclosures.

Although specific embodiments of the invention have been disclosed herein in detail, it is to be understood that this is for purposes of illustration. This disclosure is not to be construed as limiting the scope of the invention, since the described embodiments may be changed in details as will become apparent to those skilled in the art in order to adapt these air/hydro guns to particular applications, without departing from the scope of the following claims and equivalents of the claimed elements.

I claim:

1. The method of constructing an air gun including a reciprocatable shuttle having an elongated axially extending shank having an outside diameter and with a firing piston having a diameter and perimeter and being mounted on one end of the shank and an operating piston having a perimeter and mounted on the other end of the shank and wherein the operating piston is located in an operating chamber having an inner side wall surface and the firing piston is located in a discharge chamber having an inner side wall surface and at least one discharge port communicating between the discharge chamber and the exterior of the air gun and wherein pressure of pressurized gas in the operating chamber exerts holding action on the operating piston for holding the shuttle in an initial closed position for blocking access from a firing chamber to the discharge chamber for preventing pressurized gas from being released from the firing chamber and wherein the holding action of the gas pressure is overcome when the air gun is fired for permitting a sudden firing stroke of the shuttle to an open position in which the firing chamber communicates with the discharge chamber permitting presssurized gas suddenly to blast from the firing chamber through the discharge chamber and out through the discharge port and quickly thereafter the shuttle is returned to its initial position in a sudden return stroke comprising the steps of:

constructing a reciprocatable shuttle having an elongated axially extending shank of a length which is at least 2.50 times the diameter of the firing piston, providing guidance for the reciprocatable shuttle during the firing stroke and during the return stroke by sliding contact occurring solely with the elongated axially extending shank, spacing the inner side wall surface of the operating chamber away from the perimeter of the operating piston during the firing stroke and during the return stroke, and configuring the inner side wall surface of the operation chamber in a tapered shape in a surface of revolution concentric about the operating piston while staying clear of the operating piston for controlling and modulating acceleration and deceleration of the shuttle during the firing stroke.

2. The method of constructing an air gun as claimed in claim 1, including the further steps of:

constructing the shuttle as an integral one-piece member.

3. The method of constructing an air gun as claimed in claim 2, including the further step of:

constructing the shuttle essentially symmetrical end-to-end, with the operating and firing pistons essentially being mirror images of each other, except that the diameter of the firing piston is slightly less than the diameter of the operating piston.

4. The method of constructing an air gun as claimed in claim 3, including the further step of:

providing such guidance along the exterior surface of the elongated axially extending shank along an axial extent which is more than three times the outside diameter of the shank.

5. The method of constructing an air gun as claimed in claim 1, including the further steps of:

spacing the inner side wall surface of the discharge chamber away from the perimeter of the firing piston at all positions of the firing piston during sudden movement of said firing piston, and including a conic region in the inner side wall surface of the operating chamber, said conic region being a surface of revolution concentric about the operating piston.

6. An air gun impulsive energy source wherein the pressure of pressurized gas in an operating chamber having an inner wall surface is applied to an operating piston of a reciprocatable shuttle having a shank, said shank having a diameter and extending from said operating piston to a firing piston for holding the shuttle in an initial position in which the firing piston of said shuttle engages a firing seal to block access from a firing chamber to at least one discharge port for preventing pressurized gas in said firing chamber from escaping until said air gun is fired and wherein the holding action of said gas pressure is released from said shuttle when said air gun is fired for permitting sudden movement of said shuttle to an open position in which said firing chamber communicates with said discharge port permitting pressurized gas suddenly to escape form said firing chamber through said discharge port for generating an impulse, the improved air gun comprising:

an elongated cylindrical housing including a discharge chamber with at least one discharge port opening to the exterior of the air gun from said discharge chamber, said discharge chamber communicating with said firing chamber when the shuttle is in open position and being blocked from said firing chamber when the shuttle is in closed position, shuttle guiding and sealing means positioned in said cylindrical housing between said discharge chamber and said operating chamber surrounding said shank in sliding guiding contact with the shank during movement of the shank in said housing, and having a guiding length more than three times the diameter of said shank, and said operating and firing pistons have respective outside diameters which are slightly less than inside diameters of the operating chamber and discharge chamber, respectively, traversed by said pistons for eliminating sliding contact between said pistons and inner surfaces of the walls of said chambers.

7. An air gun impulsive energy source as claimed in claim 6, in which:

said shuttle guiding and sealing means comprises a bearing retainer having a bore positoned concentric with the shank of the shuttle, a first sleeve bearing mounted in the bore of the retainer and encircling the shank of the shuttle in sliding contact therewith for guiding the reciprocatable shuttle during sudden movement of the shuttle, a second sleeve bearing similar to the first sleeve bearing, said second sleeve bearing being mounted in the bore of the retainer and encircling the shank of the shuttle in sliding contact therewith for guiding the reciprocatable shuttle during sudden movement of the shuttle, said second sleeve bearing being axially aligned with the first sleeve bearing and being spaced in the axial direction from the first sleeve bearing, and a sliding seal sandwiched between the first and second sleeve bearings in sliding contact with the shank of the shuttle.

8. An air gun impulsive energy source as claimed in claim 7, in which:

said shuttle is an integral one-piece member which is essentially symmetrical end-to-end, with the operating and firing pistons essentially being mirror images of each other, except that the outside diameter of the firing piston is slightly less than the outside diameter of the operating piston, said first and second sleeve bearings are each formed in semi-cylindrical halves with a pair of longitudinal splits between each half for enabling assembly around the shank of the shuttle, said sliding seal is formed of resilient polymeric material and has a split for enabling assembly around the shank of the shuttle between said sleeve bearings, and said bearing retainer is formed in semi-cylindrical halves with a pair of longitudinal joints between each half for assembly around the first and second sleeve bearings and sliding seal around the shank of the shuttle, and at least two seal strips extending generally in a radial direction in each of said longitudinal joints for sealing them to prevent longitudinal flow of pressurized gas through the longitudinal joints of the bearing retainer.

9. The air gun impulsive energy source as claimed in claim 8, in which:

a peripheral seal encircles said bearing retainer for sealing said bearing retainer to said elongated cylindrical housing, each of said two seal strips has an inner end abutting against said sliding seal for minimizing leakage past the inner of each of said two seal strips, and each of said two seal strips has an outer end abutting against said peripheral seal for minimizing leakage past the outer end of each of said two seal strips.

10. An air gun impulsive energy source as claimed in claim 6, in which:

access from the firing chamber to the discharge chamber when the shuttle is in its open position is through a throat region of said firing chamber, said firing piston has an end surface facing toward the firing chamber and has a perimeter surface facing radially outwardly and has a slightly rounded corner at a juncture of said surface and perimeter surface, said discharge chamber is lined with a sleeve liner having an annular rabbet encircling said throat region near a location of said slightly rounded corner of the firing piston when the shuttle is in said initial position, there is an O-ring firing seal of resilient polymeric material, said O-ring firing seal is seated in said rabbet and has an inside dimater slightly smaller than the outside diameter of said perimeter surface of the firing piston and is positioned for engaging said slightly rounded corner of the firing piston when the shuttle is in its inital position, a seal support ring encircles said throat region and has generally an L-shaped cross-sectional shape with a first leg of said L-shape extending radially engaging against the surface of said O-ring firing seal facing away from the firing piston, and a second leg thereof extending in an axial direction and engaging against the surface of said O-ring firing seal facing radially inwardly toward said throat region, said seal support ring is free for movement in an axial direction, an annular spring holder mounted in fixed position and encircles said throat region near said seal support ring, said annular spring holder is spaced in an axial direction from the first leg of said seal support ring and is positioned on a side of said seal support ring opposite from said O-ring firing seal, said annular spring holder has a plurality of spring sockets therein extending in an axial direction and facing toward the first leg of said seal support ring, and a plurality of compression springs, one of said compression springs being seated in each of said spring sockets and pressing aganist said first leg of said seal support ring for continuously urging said O-ring firing seal toward said slightly rounded corner of the firing piston when the shuttle is in its initial position.

11. An air gun impulsive energy source having an elongated generally cylindrical housing including a reciprocatable shuttle having an elongated axially extending shank having an outside diameter and with a firing piston mounted on one end of the shank and an operating piston mounted on the other end of the shank and wherein the operating piston is located in an operating chamber having an inner wall surface and the firing piston is located in a discharge chamber having at least one air discharge port communicating between the discharge cahmber and the exterior fo the cylindrical housing and wherein pressure of pressurized gas in the operating chamber exerts holding action on the operating piston for holding the shuttle in an initial closed position for blocking access from a firing chamber to the discharge chamber for preventing pressurized gas from being released from the firing chamber and wherein the holding action of the gas pressure is overcome when the air gun is fired for permitting a sudden firing stroke of the shuttle to an open position in which the firing chamber communicates with the discharge chamber permitting pressurized gas suddenly to blast from the firing chamber through the discharge chamber and out through the air discharge port and quickly thereafter the shuttle is returned to its initial position in a sudden return stroke, said air gun comprising:

a two-component housing, a first component of said housing containing the operating chamber, the second component of said housing containing the firing chamber and the discharge chamber and having at least one discharge port therein, said two components of the housing abutting in end-to-end relationship and each having a peripheral flange encircling its abutting end, a ring clamp encircling said two abutting flanges for securing the two components of the housing together, the communication from the firing chamber to the discharge chamber when the shuttle is in its open position is through a throat region of said firing chamber contained within said second component of the housing, said firing piston has an end surface facing toward the firing chamber and has a perimeter surface facing radially outwardly and has a slightly rounded corner at the juncture of said end surface and perimeter surface, said discharge chamber is lined with a sleeve liner having an annular rabbet encircling said throat region near a location of said slightly rounded corner of the firing piston when the shuttle is in said initial position, there is an O-ring firing seal of resilient polymeric material, said O-ring firing seal is seated in said rabbet and has an inside diameter slightly smaller than the outside diameter of said perimeter surface of the firing piston when the shuttle is in its initial position, a seal support ring encircling said throat region and having generally an L-shaped cross-sectional shape with a first leg of said L-shape extending radially engaging against the surface of said O-ring firing seal which faces away from the firing piston, and a second leg thereof extending in an axial direction and engaging against the surface of said O-ring firing seal which faces radially inwardly toward said throat region, said seal support ring being free of movement in an axial direction, an annular spring holder mounted in fixed position and encircling said throat region near said seal support ring, said annular spring holder being spaced in an axial direction from the first leg of said seal support ring and being positioned on a side of said seal support ring opposite from said O-ring firing seal, said annular spring holder having a plurality of spring sockets therein extending in an axial direction and facing toward the first leg of said seal support ring, a plurality of compression springs, one of said compression springs being seated in each of said spring sockets and pressing against said first leg of said seal support ring for continuously urging said O-ring firing seal toward said corner of the firing piston when the shuttle is in its initial position, shuttle guiding means positioned within said two-component housing, said shuttle guiding means being in sliding guiding contact with the shank in its movement in said housing, said operating and firing pistons having respective outside diameters which are slightly less than inside diameters of the operating chamber and discharge chamber, respectively, traversed by said pistons for eliminating sliding contact between said pistons and inner surfaces of the walls of said chambers, whereby the shuttle is guided solely by said shuttle guiding means in sliding contact with said shank.

12. An air gun impulsive energy source having an elongated generally cylindrical housing including a reciprocatable shuttle having an elongated axially extending shank having an outside diameter and with a firing piston mounted on one end of the shank and an operating piston mounted on the other end of the shank and wherein the operating piston is located in an operating chamber having an inner wall surface and the firing piston is located in a discharge chamber having at least one air discharge port communicating between the discharge chamber and the exterior of the cylindrical housing and wherein pressure of pressurized gas in the operating chamber exerts holding action on the operating piston for holding the shuttle in an initial closed position for blocking access from a firing chamber to the discharge chamber for preventing pressurized gas from being released from the firing chamber and wherein the holding action of the gas pressure is overcome when the air gun is fired for permitting a sudden firing stroke of the shuttle to an open position in which the firing chamber communicates with the discharge chamber permitting pressurized gas suddenly to blast from the firing chamber through the discharge chamber and out through the air discharge port and quickly thereafter the shuttle is returned to its initial position in a sudden return stroke, said air gun comprising:
  a two-component housing,
  a first component of said housing containing the operating chamber,
  the second component of said housing containing the firing chamber and the discharge chamber and having at least one discharge port therein,
  said two components of the housing abutting in end-to-end relationship and each having a peripheral flange encircling its abutting end,
  a ring clamp encircling said two abutting flanges for securing the two components of the housing together, and being adapted to be converted into a hydro gun, comprising:
  said ring clamp forming an annular cylinder head for an annular water cylinder,
  said ring clamp being a first clamp ring,
  an annular water piston slidable over the end of said second component of the air gun housing remote from the abutting flange thereof,
  said annular water piston being in sliding sealed relationship with the exterior of said second component of the air gun housing,
  said second component of the housing having a clamp-ring mounting groove extending around an end thereof remote from the abutting flange,
  an outer cylindrical housing having an interior with an inside diameter considerably larger than an outside diameter of said two-component housing and being positionable in concentric relationship around the second component of said air gun housing for defining said annular water cylinder between said outer cylindrical housing and said second component of the air gun housing,
  a second clamp ring mountable in said clamp-ring mounting groove and being engageable with said outer cylindrical housing for mounting said outer cylindrical housing concentrically around said second component of the air gun housing,
  said first clamp ring being engageable with said outer cylindrical housing for mounting said outer cylindrical housing concentrically around said second component of the air gun housing,
  said outer cylindrical housing having at least two water discharge ports therein near said second ring clamp,
  said annular water piston being in sliding sealed relationship with the interior of said outer cylindrical housing,
  a vent line communicating through said annular cylinder head and being adapted to communicate with the atmosphere above water level when the air gun is submerged,
  said air gun discharge port communicating with said annular cylindrical space near said annular cylinder head, and
  said cylindrical housing including water refill passages communicating with said annular cylinder space near said annular cylinder head and with said annular cylinder space nearer said water discharge ports than the region of sliding sealing contact between said annular water piston and the outer cylindrical housing when the annular water piston is in an initial position near the annular cylinder head.

13. An air gun impulsive energy source having an elongated generally cylindrical housing including a reciprocatable shuttle having an elongated axially extending shank having an outside diameter and with a firing piston mounted on one end of the shank and an operating piston mounted on the other end of the shank and wherein the operating piston is located in an operating chamber having an inner wall surface and the firing piston is located in a discharge chamber having at least one air discharge port communicating between the discharge chamber and the exterior of the cylindrical housing and wherein pressure of pressureized gas in the operating chamber exerts holding action on the operting piston for holding the shuttle in an initial closed position for blocking access from a firing chamber to the discharge chamber for preventing pressurized gas from being released from the firing chamber and wherein the holding action of the gas pressure is overcome when the air gun is fired for permitting a sudden firing stroke of the shuttle to an open position in which the firing chamber communicates with the discharge chamber permitting pressurized gas suddenly to blast from the firing chamber through the discharge chamber and out through the air discharge port and quickly thereafter the shuttle is returned to its initial position in a sudden return stroke, said air gun comprising:
  a two-component housing,
  a first component of said housing containing the operating chamber,
  the second component of said housing containing the firing chamber and the discharge chamber and having at least one discharge port therein,
  said two components of the housing abutting in end-to-end relationship and each having a peripheral flange encircling its abutting end,
  a ring clamp encircling said two abutting flanges for securing the two components of the housing together,
  shuttle guiding means are positioned within said two-component housing,
  said shuttle guiding means being the only guiding means for guiding the shuttle during sudden movement of the shuttle during firing of the air gun,
  said shuttle guiding means being in sliding guiding contact with the shank during the sudden movement of the shuttle, and
  said operating and firing pistons having respective outside diameters which are less than inside diameters of inner side wall surfaces of the operting chamber and discharge chamber, respectively, traversed by said pistons for eliminating sliding contact between said pistons and the side wall surfaces of said chambers.

14. An air gun impulsive energy source as claimed in claim 13, in which:
  the shank of the shuttle has a length which is at least 2.50 times the diameter of the firing piston.

15. An air gun impulsive energy source as claimed in claim 13, in which:
  said shuttle guiding means encircles the shank of the shuttle, and
  said shuttle guiding means spans along said shank for an axial distance of more than three times the outside diameter of the shank.

* * * * *